(12) United States Patent
Souma et al.

(10) Patent No.: US 7,113,346 B1
(45) Date of Patent: Sep. 26, 2006

(54) VARIABLE MAGNIFICATION OPTICAL SYSTEM

(75) Inventors: Yoshihito Souma, Sakai (JP); Makoto Jin, Sakai (JP); Tetsuya Arimoto, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/222,177

(22) Filed: Sep. 8, 2005

(30) Foreign Application Priority Data

May 10, 2005 (JP) .............................. 2005-136873

(51) Int. Cl.
*G02B 15/14* (2006.01)

(52) U.S. Cl. ........................................ 359/687; 359/679
(58) Field of Classification Search ......... 359/676–692
See application file for complete search history.

(56) References Cited

U.S. PATENT DOCUMENTS

| | | | | |
|---|---|---|---|---|
| 5,537,255 A | * | 7/1996 | Tochigi | 359/684 |
| 5,546,230 A | * | 8/1996 | Sato et al. | 359/684 |
| 5,694,252 A | * | 12/1997 | Yahagi | 359/684 |
| 5,751,496 A | * | 5/1998 | Hamano | 359/677 |
| 5,774,275 A | * | 6/1998 | Hamano | 359/687 |
| 5,818,646 A | * | 10/1998 | Hamano | 359/684 |

FOREIGN PATENT DOCUMENTS

| | | |
|---|---|---|
| JP | 4-78809 A | 3/1992 |
| JP | 5-19167 A | 1/1993 |
| JP | 5-241072 A | 9/1993 |
| JP | 5-264902 A | 10/1993 |
| JP | 8-327903 A | 12/1996 |

* cited by examiner

*Primary Examiner*—Scott J. Sugarman
*Assistant Examiner*—Mohammed Hasan
(74) *Attorney, Agent, or Firm*—Sidley Austin LLP (57) ABSTRACT

A variable magnification optical system for forming an optical image of an object on the light-receiving surface of an image sensor with variable magnification includes: from an object side, a first lens unit having a positive optical power, a second lens unit having a negative optical power, a third lens unit having a positive optical power, a fourth lens unit having a positive optical power, and a fifth lens unit. In magnification variation from the wide-angle end to the telephoto end, the first lens unit, the third lens unit, and the fifth lens unit are kept in fixed positions whereas the second lens unit and the fourth lens unit move. The third lens unit includes, from the object side, a positive lens element having a biconvex form, and a negative lens element having a form concave to an image side. The negative lens element has an aspherical surface.

17 Claims, 3 Drawing Sheets

FIG.2A
FNO=3.50

(W)

— d
— · — g
— — c
— — — SC

-0.1  0.1
SPHERICAL SINE
ABERRATION CONDITION

-0.1  0.1
ASTIGMATISM

FIG.2C
Y'=3.6

-5.0  5.0
DISTORTION %

FIG.2D
FNO=3.70

(M)

— d
— · — g
— — c
— — — SC

-0.1  0.1
SPHERICAL SINE
ABERRATION CONDITION

-0.1  0.1
ASTIGMATISM

FIG.2F
Y'=3.6

-5.0  5.0
DISTORTION %

FIG.2G
FNO=3.91

(T)

— d
— · — g
— — c
— — — SC

-0.1  0.1
SPHERICAL SINE
ABERRATION CONDITION

-0.1  0.1
ASTIGMATISM

FIG.2I
Y'=3.6

-5.0  5.0
DISTORTION %

FIG.3

VARIABLE MAGNIFICATION OPTICAL SYSTEM

This application is based on Japanese Patent Application No. 2005-136873 filed on May 10, 2005, the contents of which are hereby incorporated by reference.

BACKGROUND OF THE INVENTION

1. Field of the Invention The present invention relates to a variable magnification optical system, for example, a variable magnification optical system suitable for a digital camera and a digital appliance provided with an image input capability that take in an image of a subject by an image sensor (especially a compact zoom lens system that offers high performance), and to an image-taking apparatus provided with such a variable magnification optical system.

2. Description of Related Art

Many of well-known zoom lens systems for use in digital still cameras and video cameras are so-called four-unit zoom lens systems each including positive, negative, positive, and positive lens units. This zoom lens system includes: a first lens unit having a positive optical power; a second lens unit having a negative optical power; a third lens unit having a positive lens unit; and a fourth lens unit having a positive optical power. Patent documents 1 to 5 below have proposed the zoom lens systems aimed at better performance and shorter lens full length by additionally arranging, on the image side of the positive, negative, positive, and positive lens units, a fifth lens unit that is kept in a fixed position during zooming:

[Patent document 1] Japanese Patent Application Laid-open No. H04-78809

[Patent document 2] Japanese Patent Application Laid-open No. H05-19167

[Patent document 3] Japanese Patent Application Laid-open No. H05-241072

[Patent document 4] Japanese Patent Application Laid-open No. H05-264902

[Patent document 5] Japanese Patent Application Laid-open No. H08-327903.

However, in any of the zoom lens systems described in patent documents 1 to 4, the third lens unit mainly involved in convergence process has a relatively small optical power, thus making it difficult to downsize the zoom lens system. In contrast, the zoom lens system described in patent document 5 has been downsized by providing the third lens unit with a relatively large optical power. Spherical aberration and coma that increase as a result of increasing the optical power of the third lens unit are corrected by providing the positive lens element of the third lens unit with an aspherical surface. Since the positive lens element of the third lens unit needs to be provided with a large optical power, the degree of freedom in correcting aberrations by use of the aspherical surface is limited, which results in hindering performance improvement.

SUMMARY OF THE INVENTION

In view of the above-mentioned problem, it is an object of the present invention to provide a compact variable magnification optical system that offers high-performance and an image-taking apparatus provided with such a variable magnification optical system.

To achieve the object described, according to one aspect of the present invention, a variable magnification optical system for forming an optical image of an object on the light-receiving surface of an image sensor with variable magnification includes: from an object side; a first lens unit having a positive optical power; a second lens unit having a negative optical power; third lens unit having a positive optical power; fourth lens unit having a positive optical power; and a fifth lens unit. In magnification variation from the wide-angle end to the telephoto end, the first lens unit, the third lens unit, and the fifth lens unit are kept in fixed positions whereas the second lens unit and the fourth lens unit move. The third lens unit includes, from the object side, a positive lens element having a biconvex form, and a negative lens element having a form concave to the image side. The negative lens element has an aspherical surface.

According to another aspect of the invention, an image-taking apparatus includes: a variable magnification optical system for forming an optical image of an object with variable magnification; and an image sensor for converting the optical image into an electrical signal. The variable magnification optical system includes: from an object side, a first lens unit having a positive optical power, a second lens unit having a negative optical power, a third lens unit having a positive optical power, a fourth lens unit having a positive optical power, and a fifth lens unit. In magnification variation from the wide-angle end to the telephoto end, the first lens unit, the third lens unit, and the fifth lens unit are kept in fixed positions whereas the second lens unit and the fourth lens unit move. The third lens unit includes, from the object side, a positive lens element having a biconvex form, and a negative lens element having a form concave to the image side. The negative lens element has an aspherical surface.

DETAILED DESCRIPTION OF PREFERRED EMBODIMENTS

Hereinafter, a variable magnification optical system, an image-taking apparatus, and the like embodying the present invention will be described with reference to the drawings. The image-taking apparatus according to the present invention is an optical apparatus that optically takes in an image of a subject and then outputs it in the form of an electrical signal. Such an image-taking apparatus is used as a main component of a camera that is used to photograph a still or moving picture of a subject. Examples of such cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, and printers), and other digital appliances. As these examples show, by the use of an image-taking apparatus, it is possible not only to build a camera but also to incorporate an image-taking apparatus in various devices to provide them with a camera capability. For example, it is possible to realize a digital appliance provided with an image input capability, such as a cellular phone furnished with a camera.

The term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking apparatus provided with an image-taking lens system for forming an optical image, an image sensor for converting an optical image into an electrical signal, and other components, examples of such cameras including digital still cameras, digital movie cameras, and Web cameras (i.e., cameras that are connected, either publicly or privately, to a device connected to a network to permit transmission and reception of images, including both those connected directly to a network and those connected to a network by way of a device, such as a personal computer, having an information processing capability).

Figure 3:
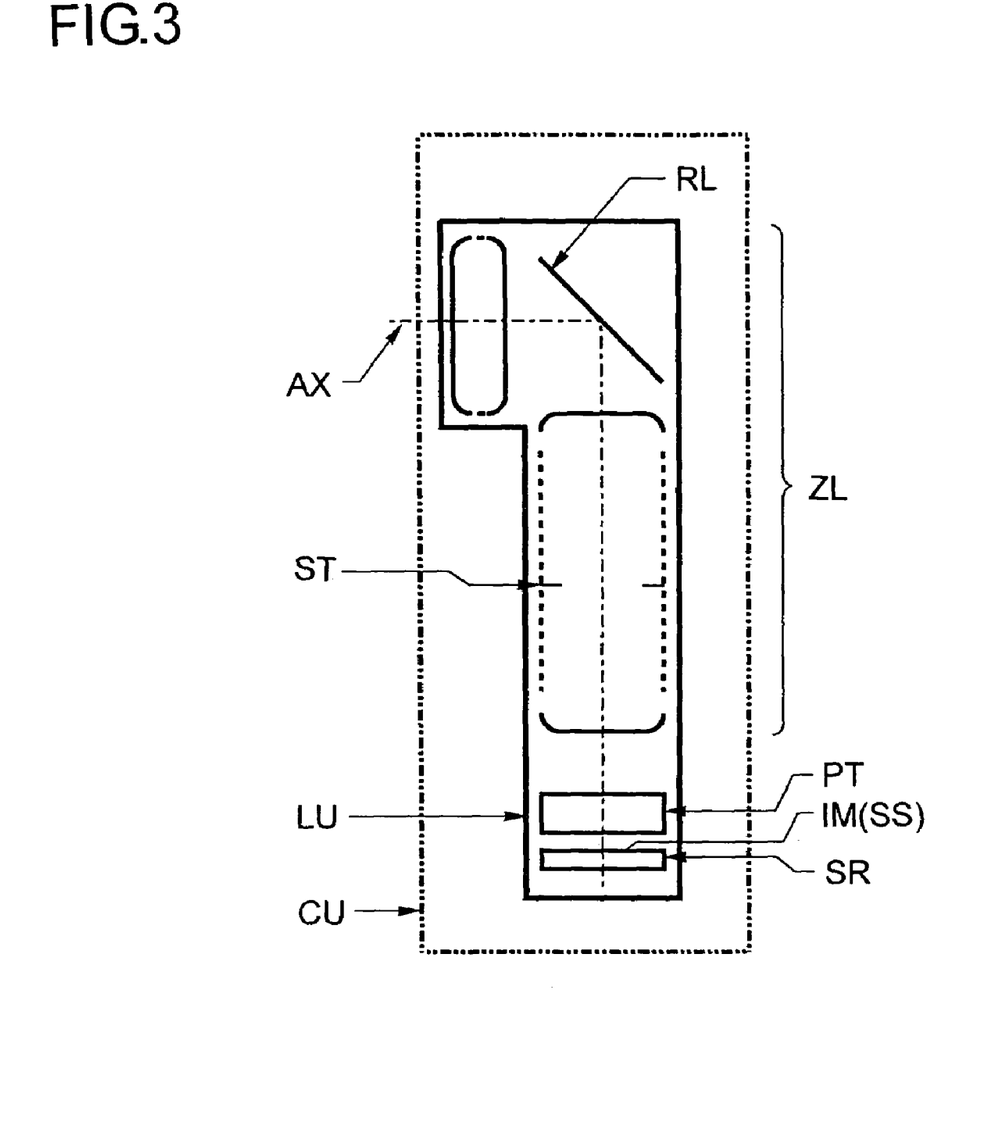
FIG. 3 is a side view with a schematic cross section showing an example of the schematic optical construction of a camera installed in an image-taking apparatus according to the present invention.

FIG. 3 shows an example of the schematic optical construction of a camera CU (corresponding to a digital camera, a digital appliance provided with an image input capability, or the like) with a schematic cross section. An image-taking apparatus LU to be mounted in the camera CU includes: from the object (i.e., subject) side thereof, a zoom lens system ZL (corresponding to a variable magnification optical system as an image-taking lens system, ST: aperture stop) for forming an optical image (image surface IM) of an object with variable magnification; a parallel-plane plate PT (corresponding to an optical filter such as an optical low-pass filter or infrared cut filter arranged as required, the cover glass of an image sensor SR, or the like); and an image sensor SR for converting the optical image IM formed on the light-receiving surface SS thereof by the zoom lens system ZL into an electrical signal. The image-taking apparatus LU is used as a component of the camera CU corresponding to a digital camera, portable data device provided with an image input capability (i.e., a compact and portable data device terminal such as a cellular phone or PDA), or the like. When this image-taking apparatus LU is incorporated in a digital camera, the image-taking apparatus LU is usually arranged inside the body of the camera. Here, the camera capability can be realized in a desired manner that suits particular needs. For example, the image-taking apparatus LU may be built as a unit that is freely detachable from or freely rotatable relative to the body of the camera; or the image-taking apparatus LU may be built as a unit that is freely detachable from or freely rotatable relative to a portable data device (such as a cellular phone or PDA).

The image-taking apparatus shown in FIG. 3 has a planar reflective surface RL arranged at some point of the optical path in the zoom lens system ZL. On the front and rear sides of the reflective surface RL, there is arranged at least one lens element each. The optical path is bent by this reflective surface RL so as to use the zoom lens system ZL as a bending optical system. In this bending, an optical beam is reflected in such a way as to bend the optical axis AX at approximately 90 degrees (i.e., 90 degrees or substantially 90 degrees). Providing, on the optical path of the zoom lens system ZL, the reflective surface RL that bends the optical path increases the degree of freedom in the arrangement of the image-taking apparatus LU and also changes the size of the image-taking apparatus LU in the thickness-direction, thereby permitting achieving the slimmed-down appearance of the image-taking apparatus LU. Particularly, arranging one negative lens element on the most object side and arranging the reflective surface RL on the image side of this negative lens element, as is the case with an embodiment of the zoom lens system ZL as described below (FIG. 1), is very effective in achieving the slimming-down. The position at which the optical path is bent is not limited to some point in the zoom lens system ZL, but may be set in front of or behind the zoom lens system ZL as appropriate. The adequate bending of the optical path can effectively achieve the downsizing as well as slimmed-down appearance of the camera CU where the image-taking apparatus LU is installed.

Figure 1A:
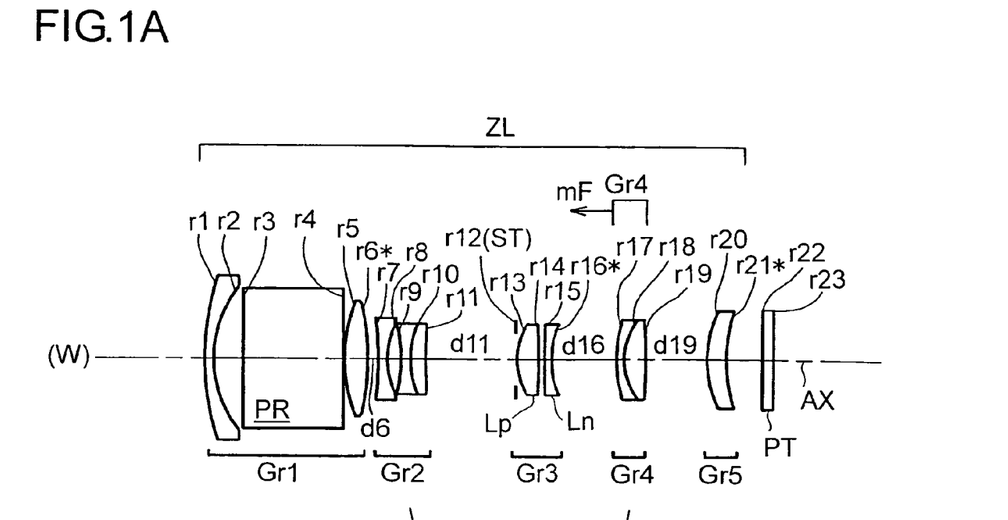
FIGS. 1A to 1C show the lens construction of a zoom lens system of an embodiment (example) according to the present invention.
Figure 1B:
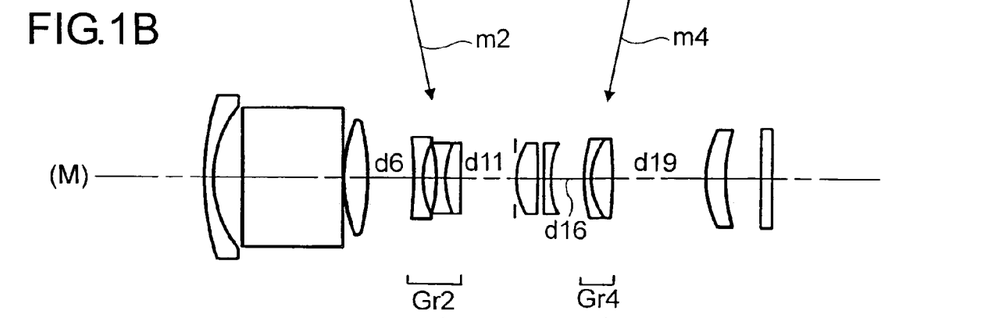
Figure 1C:
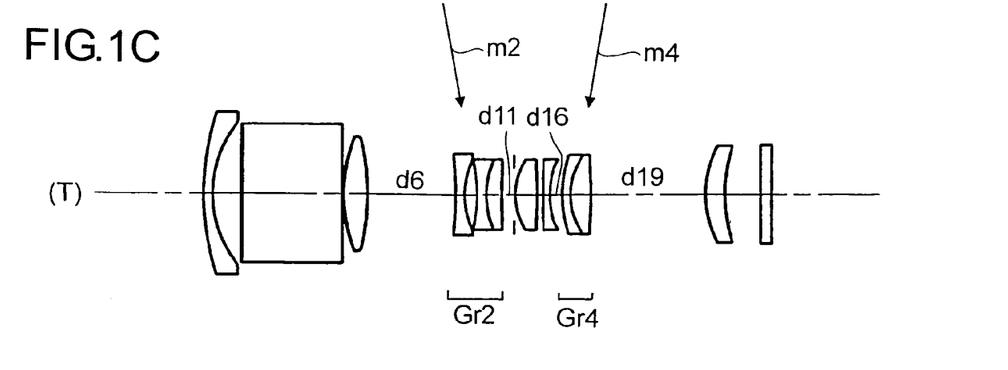
Figure 2A:
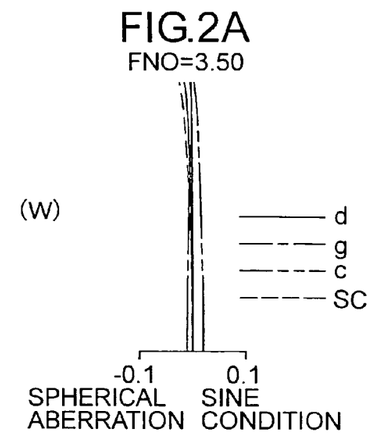
FIGS. 2A to 2I are aberration diagrams of an example of the zoom lens system.
Figure 2B:
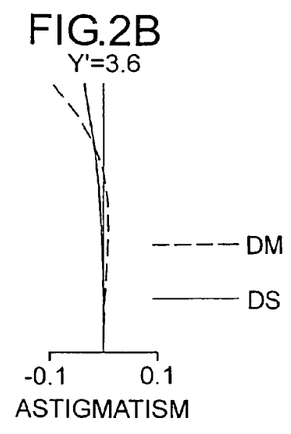
Figure 2C:
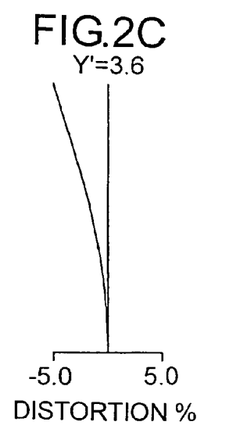
Figure 2D:
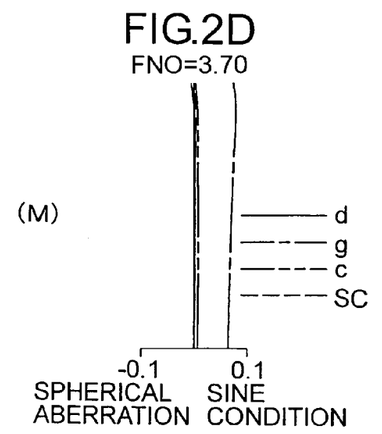
Figure 2E:
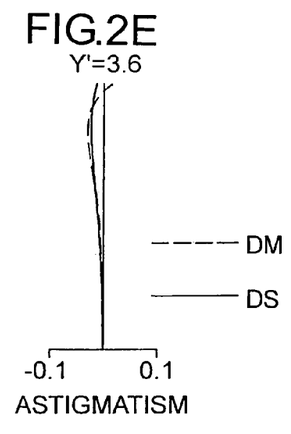
Figure 2F:
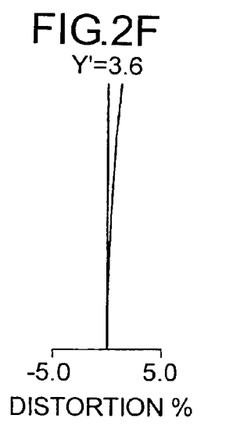
Figure 2G:
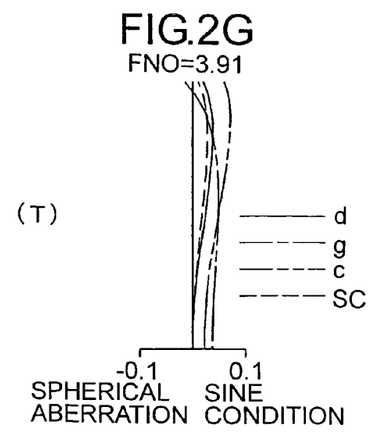
Figure 2H:
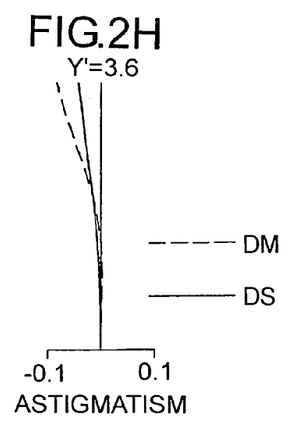
Figure 2I:
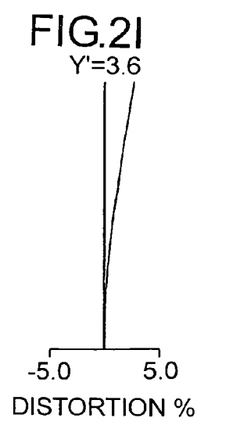

The reflective surface RL is formed of reflective material, such as prisms (e.g., a rectangular prism) or mirrors (e.g., a flat mirror). For example, in the embodiment of the zoom lens system ZL described below (FIG. 1), a prism PR (preferably rectangular prism) is used as the reflective material. However, the reflective material to be used is not limited to prisms. Mirrors, such as a flat mirror, may be used to form the reflective surface RL. Moreover, a reflective material may be used which reflects the optical beam in such a way as to bend the optical axis AX of the zoom lens system ZL at approximately 90 degrees by using two or more reflective surfaces. The optical mechanism for bending the optical path is not limited to reflection, but it can also be refraction, diffraction, or those in combination. That is, a bending optical member including a reflective surface, a refractive surface, a diffractive surface, or those in combination may be used.

The prism PR used in the embodiment (FIG. 1) of the zoom lens system ZL as described below do not have optical power (here, the optical power is a quantity defined as the reciprocal of the focal length). However, the optical member for bending the optical path may be provided with optical power. For example, having the reflective surface RL, the light entrance side surface, and the light exit side surface of the prism PR share the optical power of the zoom lens system ZL can reduce the optical power shared by the lens elements and thereby improve optical performance. In the zoom lens system ZL shown in FIG. 1, the negative lens element is arranged on the object side of the prism PR. Rather than employing this lens element arrangement, the object side surface (i.e., light entrance side surface) of the prism PR may be provided with a certain degree of curvature to have a negative (or positive) optical power.

The zoom lens system ZL includes a plurality of lens units, at least one of which moves along the optical axis AX, and performs magnification variation (i.e. zooming) by changing at least one distance between lens units. The embodiment of the zoom lens system ZL as described below (FIG. 1) employs 5-unit zoom lens construction including positive, negative, positive, positive, and positive lens units, in which the second and the fourth lens units Gr2 and Gr4 are movable unit whereas the first, third, and fifth lens units Gr1, Gr3, and Gr5 are fixed units. The image-taking lens system to be used in the image-taking apparatus LU is not limited to the zoom lens system ZL. Instead of the zoom lens system ZL, other types of variable magnification optical systems (for example, a variable-focal-length imaging optical system such as a varifocal lens system or a lens system that permits switching among a plurality of focal lengths) may be used as an image-taking lens system.

The optical image to be formed by the zoom lens system ZL passes through the optical low-pass filter (corresponding to the parallel-plane plate PT shown in FIG. 3) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electric signal. This helps alleviate the generation of color moiré. Aiming at moderate performance around the resolution limit frequency makes it possible to disregard the generation of noise without the use of an optical low-pass filter. Moreover, in a case where the user photographs or observes images by the use of a display system (such as the liquid crystal display screen of a cellular phone or the like) on which noise is inconspicuous, there is no need to use an optical low-pass filter in the image-taking lens system.

Used as the optical low-pass filter is a birefringence-type low-pass filter, phase-type low-pass filter, or the like. Examples of birefringence-type low-pass filters include those made of a birefringent material such as quartz having a crystal axis appropriately aligned in a predetermined direction and those composed of wavelength plates or the like, which change the polarization plane, laid on one another. Examples of phase-type low-pass filters include those that achieve required optical cut-off frequency characteristics by exploiting diffraction.

Used as the image sensor SR is a solid-state image sensor such as a CCD (charge-coupled device) or CMOS (complementary metal oxide semiconductor) sensor having a plurality of pixels. The optical image formed (on the light-receiving surface SS of the image sensor SR) by the zoom lens system ZL is converted into an electrical signal by the image sensor SR. The signal produced by the image sensor SR is subjected to predetermined digital image processing, image compression processing, or the like as required, and is recorded in a memory (such as a semiconductor memory or an optical disk) as a digital video signal; in some cases, the signal is transferred to another appliance through a cable or after being converted into an infrared signal.

In the image-taking apparatus LU shown in FIG. 3, the zoom lens system ZL performs reduced projection from the subject on the enlargement side to the image sensor SR on the reduction side. The use of a display element for displaying a two-dimensional image (for example, liquid crystal display element) instead of the image sensor SR plus the use of the zoom lens system ZL as a projection lens system can provide an image projector for performing enlarged projection from the image display surface on the reduction side to the screen surface on the enlargement side. That is, the zoom lens system ZL of the embodiments as described below is not limited for use as an image-taking lens system, but favorably usable as a projection lens system.

FIGS. 1A to 1C are lens construction diagrams of the zoom lens systems ZL as one embodiment of a variable magnification optical system according to the present invention, illustrating the lens arrangement and the like at the wide-angle (W), middle angle (M), and angle (T), respectively, each with the optical path linearly expanded in optical cross section of a bending optical system. In each of the lens construction diagrams, a surface marked as ri (i=1, 2, 3, ...) is the i-th surface from the object side (with an asterisk (*) following ri indicating an aspherical surface), and an axial distance marked as di (i=1, 2, 3, ...) is the i-th axial distance from the object side, though only those axial distances which vary as zooming is performed, i.e., variable axial distances, are shown here. Arrows m2 and m4 schematically show movements of the second and fourth lens units Gr2 and Gr4, respectively, in zooming from the wide-angle end (W) to the middle (M), and from the middle (M) to the telephoto end (T) (i.e. changes in the position relative to the image surface IM). Arrow mF schematically shows the movement of the focus lens unit (in this embodiment, fourth lens unit Gr4) from the infinite photographing to close-distance photographing. The parallel plane plate PT is kept in a fixed position during zooming, as is the case with the fixed units Gr1, Gr3, and Gr5.

The zoom lens system ZL shown in FIG. 1 includes five lens units: from the object side, a first lens unit GR1 having a positive optical power; a second lens unit GR2 having a negative optical power; a third lens unit GR3 having a positive optical power; a fourth lens unit GR4 having a positive optical power; and a fifth lens unit GR5 having a positive optical power. In variable magnification from the wide-angle end (W) to the telephoto angle (T), the first lens unit Gr1, third lens unit Gr3, and fifth lens unit Gr5 are kept in fixed positions while the second lens unit Gr2 and the fourth lens unit Gr4 moves. In this 5-unit zoom construction including the positive, negative, positive, positive, and positive lens units, each of the lens units is constructed as follows.

The first lens unit Gr1 includes: from the object side, a negative meniscus lens element concave to the image side; the prism PR; and a biconvex positive lens element having an aspherical surface on the image side. The second lens unit Gr2 includes: from the object side, a biconcave negative lens element, and a cemented lens element formed by cementing together a biconcave negative lens element and a positive meniscus lens element convex to the object side. The third lens unit Gr3 includes: from the object side, the aperture stop ST; a biconvex positive lens element Lp; and a negative meniscus lens element Ln that has an aspherical surface on the image side and is concave to the image side. The fourth lens unit Gr4 includes only one cemented lens element formed by cementing together a negative meniscus lens element concave to the image side and a biconvex positive lens element. The fifth lens unit Gr5 includes only one positive meniscus lens element that has an aspherical surface on the image side and is convex to the object side. In zooming from the wide-angle end (W) to the telephoto angle end (T), the first, third, and fifth lens units Gr1, Gr3, and Gr5 are kept in the fixed positions relative to the image surface IM during zooming. The second lens unit Gr2 moves toward the image side in a substantially linear (i.e., monotonic) manner. The fourth lens unit Gr4 moves in such a manner as to describe a curve gently convex to the object side.

As in the zoom lens system ZL shown in FIG. 1, in a variable magnification optical system including, from the object side, a first lens unit having a positive optical power, a second lens unit having a negative optical power, a third lens unit having a positive optical power, a fourth lens unit having a positive optical power, and a fifth lens unit (having a positive or negative optical power), in which the first, third, and fifth lens units are kept in the fixed positions whereas the second and fourth lens units move in magnification variation form the wide-angle end to the telephoto end, the axial ray height is largest in the third lens unit. Thus, it is preferable that the third lens unit include, from the object side, a positive lens element and a negative lens element. To achieve downsizing of such a variable magnification optical system, it is required to increase the optical power of the third lens unit in a relative manner. To increase the optical power of the third lens unit in a relative manner, it is preferable that the third lens unit include, from the object side, a positive lens element having a biconvex form, and a negative lens element having a form concave to the image side. Increasing the optical power of the third lens unit results in worse aberrations, which can be controlled by decreasing the negative optical power of the third lens unit.

Thus, it is preferable to use, as the negative lens element having a form concave to the image side described above, a negative lens element having a meniscus form concave to the image side or having a plano-concave form concave to the image side. In this view, in the zoom lens system ZL shown in FIG. 1, the third lens unit Gr3 includes, from the object side, the biconvex positive lens element Lp, and the negative meniscus lens element Ln concave to the image side.

The third lens unit described above exerts an influence upon the occurrence of spherical aberration and coma over the entire magnification variation range. Thus, it is preferable that the third lens unit be provided with an aspherical surface. Providing an aspherical surface to a lens element which is high in the degree of freedom in aberration correction and which is weak in optical power can achieve large effect provided by the aspherical surface. Therefore, it is preferable that the negative lens element having a form concave to the image side as described above (specifically, the meniscus lens element concave to the image side or plano-concave lens element concave to the image side) have an aspherical surface. The positive lens element has a strong optical power on the lens surface; therefore, providing this lens surface with an aspherical surface makes it difficult to correct aberrations other than spherical aberration. Accordingly, providing an aspherical surface to the negative lens element having a small optical power rather than the positive lens element having a large optical power permits easier aberration correction. Moreover, providing the negative lens element with an aspherical surface results in a relatively smaller axial light beam height than the positive lens element, which is advantageous in terms of production errors.

As described above, providing the construction such that the third lens unit includes, from the object side, the positive lens element having a biconvex form and the negative lens element having a meniscus form concave to the image side or having a plano-concave form concave to the image side and such that this negative lens element is provided with an aspherical surface can effectively achieve proper balance between downsizing and high-performance, thus providing a downsized variable magnification optical system that offers high performance and an image-taking apparatus provided therewith. The use of this image-taking apparatus in digital cameras, portable data devices, and the like can contribute to slimming, weight-saving, downsizing, and cost reduction of these devices with higher performance and higher functions.

It is preferable that the negative lens element have an aspherical surface on the image side. If the positive lens element is provided with an aspherical surface, both the axial rays and the off-axial rays pass through almost the common area of the aspherical surface. On the other hand, if the negative lens element is provided with an aspherical surface on the image side, the axial rays pass through the lower position whereas the off-axial rays pass through the position so high as to reach the edge of the aspherical surface, thus achieving proper balance between the axial and off-axial optical aberration corrections. Thus, it is preferable that the negative lens element (specifically, the meniscus lens element concave to the image side or the plano-concave lens element concave to the image side) have an aspherical surface on the image side. In this view, in the zoom lens system ZL shown in FIG. 1, the negative meniscus lens element Ln concave to the image side has an aspherical lens surface on the image side.

It is preferable that the third lens unit have the aperture stop on the most object side. The arrangement of the aperture stop on the most object side of the third lens unit locates this aperture stop at the substantially center of the entire variable magnification optical system. This permits effectively suppressing the occurrence of various aberrations. With the construction such that the aperture stop is located on the most object side of the third lens unit, the aspherical surface provided to the negative lens element is located at a great distance from the aperture stop. Therefore, the height of off-axial principle rays is higher on the aspherical surface than when an aspherical surface is provided to the positive lens element, thus resulting in a higher degree of freedom in aberration correction (e.g., correction of astigmatism, curvature of field, and the like) than when the positive lens element is provided with an aspherical surface. When the negative lens element (specifically, the meniscus lens element concave to the image side or the plano-concave lens element concave to the image side) is provided with an aspherical surface on the image side, the aspherical surface is located at a even greater distance from the aperture stop, thus enhancing its effect. Therefore, also in this sense, it is preferable that the surface of the negative lens element on the image side be formed to be aspherical.

It is preferable that at least one of the lens elements included in the third lens unit be formed of resin. That is, it is preferable that at least one plastic lens element be used for the third lens unit. The use of at least one plastic lens element for the third lens unit is effective in achieving cost reduction and weight saving of the variable magnification optical system. It is further preferable that the plastic lens element be used as the negative lens element (specifically, the meniscus lens element concave to the image side or the plano-concave lens element concave to the image side) in the third lens unit. The plastic lens element exhibits a larger change in the refractive index with respect to temperature change than the glass lens element (i.e., has greater dependence on temperature). To restrict the influence of the temperature dependence of the refractive index, it is required to decrease the optical power of the plastic lens element to thereby lower the sensitivity to the change in the refractive index. As described previously, the negative lens element has a lower optical power than the positive lens element, and thus has lower sensitivity to the change in the refractive index. Therefore, the use of the plastic lens element as the negative lens element in the third lens unit permits suppressing fluctuation in aberrations or fluctuation in the back focal length in the event of temperature change, and also permits providing high performance achieved by the aspherical surface. To achieve these effects, the negative meniscus lens element Ln used is formed of PC (polycarbonate) in an example described below.

For the power of the third lens unit, it is preferable that conditional formula (1) below be fulfilled.

$$1 < f3/fw < 3 \qquad (1)$$

where
    f3 represents the focal length of the third lens unit; and
    fw represents the focal length of the entire system at the wide-angle end.

Conditional formula (1) defines a preferable conditional range of the focal length of the third lens unit. By fulfilling conditional formula (1), it is possible to optimize the balance between downsizing of the variable magnification optical system and aberration correction. If the upper limit of this conditional formula (1) is disregarded, the variable magnification optical system grows in size. By contrast, if the lower limit of conditional formula (1) is disregarded, the optical power of the third lens unit increases, making it difficult to satisfactorily correct aberrations.

It is further preferable that conditional formula (1a) below be fulfilled.

$$1 < f3/fw < 2.6 \quad (1a)$$

This conditional formula (1a) defines a further preferable conditional range within that defined by conditional formula (1) from the above-mentioned view points and out of other considerations. By fulfilling this conditional formula (1a), it is possible to further optimize the balance between the downsizing and the aberration correction.

It is preferable that focusing be performed by the movement of the fourth lens unit. In the zoom lens system ZL, as shown by the arrow mF (FIG. 1), focusing from an object at infinity to a close object is performed by moving the fourth lens unit Gr4 to the object side. Conventionally, a lens element is driven for zooming by transmitting the power of one drive device to a plurality of movable lens units via a zoom cum. On the other hand, focusing is performed by the movement of a focus lens unit using a different drive device. However, as in the zoom lens system ZL shown in FIG. 1, providing two lens units that move during zooming or focusing permits connecting drive devices directly to the two respective lens units without use of a cum or the like. It is preferable that zooming and focusing be performed by controlling the amount of movement made by each of the lens units, since no cum is required. This permits simplified construction and thus leads to slimmed-down construction. Moreover, as in the zoom lens system ZL shown in FIG. 1, it is preferable that the fourth lens unit be formed by at least one negative lens element and at least one positive lens element so that focusing during close-in shooting is performed by bringing the fourth lens unit toward the object side. This permits decreasing fluctuation in aberrations during focusing.

For the magnification variation range, it is preferable that conditional formula (2) below be fulfilled.

$$2.5 < ZR < 4 \quad (2)$$

where

ZR represents a magnification variation ratio.

Conventional well-known 5-unit zoom construction including positive, negative, positive, positive, and (positive or negative) lens units makes a sacrifice of the total size of the variable magnification optical system to achieve a high magnification variation ratio. That is, the lens diameter of the first lens unit and the full length of the variable magnification optical system increase, thus leading to the upsizing of the entire variable magnification optical system. Setting the magnification variation range so as to satisfy conditional formula (2) can decrease the lens diameter of the first lens unit and the like and also shorten the total length of the variable magnification optical system, thus permitting favorable balance among the size, magnification variation range, and optical performance in the variable magnification optical system. When the zoom lens system ZL is used as a bending optical system as shown in FIG. 3, downsizing the zoom lens system ZL in the direction of the lens diameter is particularly effective in slimming down the image-taking apparatus LU and the camera CU.

As described previously, the zoom lens system ZL shown in FIG. 1 has the prism PR as a reflective member in the first lens unit Gr1. That is, the first lens unit Gr1, which is kept in the fixed position during zooming, has the reflective surface RL that bends the optical axis AX at approximately 90 degrees. Thus, if the zooming position of the first lens unit is fixed with respect to the image surface during variation magnification, no great load needs to be imposed on the drive mechanism for moving the prism having a large weight. Moreover, no large space is required for moving the first lens unit, which permits shorter length of the variable magnification optical system in the direction of the optical axis on the light entrance side, and thus permits providing a variable magnification optical system whose full length does not change (i.e., the thickness does not change due to variable magnification or collapsing). No change in the full length of the variable magnification optical system permits holding the entire variable magnification optical system with boxed-shaped structure, and thus permits holding the variable magnification optical system with construction of high rigidity.

The zoom lens system ZL shown in FIG. 1 is formed of refractive lens elements, which deflect incident light by refraction (i.e. lens elements of the type that deflects light at the interface between two media having different refractive indices). It is possible, however, to replace any of these lens elements with a lens element, such as a diffractive lens element which deflects incident light by diffraction, a refractive/diffractive hybrid lens element which deflects incident light by diffraction and refraction combined together, or a gradient index lens element which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material. In the zoom lens system ZL, the aperture stop ST is used as an optical element in addition to the lens elements. A beam restricting plate (e.g., flare cutter) or the like for cutting unnecessary light may also be additionally arranged in the zoom lens system ZL as necessary.

EXAMPLE

Hereinafter, the construction and other features of a practical example of the zoom lens system embodying the present invention will be presented with reference to its construction data and other data. The example presented below is a numerical example corresponding to the embodiment of the zoom lens system described hereinbefore, and therefore FIG. 1 shows the lens construction, etc. of the example.

Tables 1 shows the construction data, the values of the conditional formula, etc. as actually observed in the example. In the basic optical construction (with i representing the surface number) as shown in table 1, ri (i=1, 2, 3, ...) represents the radius of curvature (in mm) of the i-th surface from the object side, di (i=1, 2, 3, ...) represents the axial distance (in mm) between the i-th and (i+1)-th surfaces from the object side, and Ni (i=1, 2, 3, ...) and vi (i=1, 2, 3, ...) respectively represent the refractive index (Nd) for the d-line and the Abbe number (vd) of the optical material filling the axial distance di. The axial distance di that changes during zooming is the variable air distance among the wide angle end (the shortest-focal-length state, W), the middle position (the middle-focal length state, M), and the telephoto end (the longest-focal-length state, T). Numerals f and FNO respec tively represent the focal length (in mm) and the f-number of the entire system at the different focal lengths (W, M, and T).

A surface of which the radius of curvature ri is marked with an asterisk (*) is an aspherical surface (a refractive optical surface having an aspherical shape, a surface exerting a refracting effect equivalent to that of an aspherical surface, or the like), of which the surface shape is defined by formula (AS) below. Table 1 shows the aspherical surface data of the example. It should be noted that any coefficient that is not shown equals 0, and that, for all the data, "E−n" represents "×10$^{-n}$".

$$X(H)=(C0 \cdot H^2)/\{1+\sqrt{(1-\epsilon \cdot C0^2 \cdot H^2)}\}+\Sigma(Aj \cdot H^j) \quad (AS)$$

where

X(H) represents the displacement along the optical axis AX at the height H (relative to the vertex);

H represents the height in a direction perpendicular to the optical axis AX;

C0 represents the paraxial curvature (=1/ri);

ϵ represents the quadric curved surface parameter; and

Aj represents the aspherical surface coefficient of the j-th order.

FIGS. 2A to 2I are aberration diagrams of the example. Of these aberration diagrams, those with numbers suffixed with A, B, or C show the aberrations observed at (W) representing the wide angle end, those with numbers suffixed with D, E, or F show the aberrations observed at (M) representing the middle position, and those with numbers suffixed with G, H, or I show the aberrations observed at (T) representing the telephoto end. Of these aberration diagrams, those with numbers suffixed with A, D, or G show spherical aberration, those with numbers suffixed with B, E, or H show astigmatism, and those with numbers suffixed with C, F, or I show distortion. FNO represents the F number, and Y' (in mm) represents the maximum image height (corresponding to the distance from the optical axis) on the light-receiving surface SS of the image sensor SR. In the spherical aberration diagrams, a solid line d represents the spherical aberration (in mm) for the d-line, a chain single-dashed line g represents the spherical aberration (in mm) for the g-line, and a chain double-dashed line c represents the spherical aberration (in mm) for the c-line. A broken line SC represents the deviation (in mm) from the sine condition to be fulfilled. In the astigmatism diagrams, a broken line DM represents the astigmatism (in mm) for the d-line on the meridional surface, and a solid line DS represents the astigmatism (in mm) for the d-line on the sagittal surface. In the distortion diagrams, a solid line represents the distortion (in %) with respect to the d-line.

As described above, according to the present invention, the third lens unit includes, from the object side, the positive lens element having a biconvex form, and the negative lens element having a meniscus form concave to the image side or having a plano-concave form concave to the image side, and the negative lens element has an aspherical surface. This permits effectively achieving proper balance between downsizing and high performance, thus permitting providing a downsized variable magnification optical system that offers high performance and an image-taking apparatus provided with such a variable magnification optical system. The use of the image-taking apparatus according to the present invention in digital cameras, portable data devices, and the like can contribute to achievement in slimming-down, weigh-saving, downsizing, and cost reduction of these devices that offer higher performance and higher functions.

TABLE 1

| Example | Focal Length Condition f[mm] FNO Values of Conditional Formulae | | (W)~(M)~(T) 6.307~10.006~18.907 3.50~3.70~3.91 (1):f3/f2 = 2.0 (2):ZR = 3.0 | |
|---|---|---|---|---|
| i | ri[mm] | di[mm] | Ni | vi | Symbol, etc. |
| 1 | 23.612 | 0.800 | 1.846660 | 23.78 | Gr1(+) |
| 2 | 10.565 | 2.600 | | | |
| 3 | ∞ | 9.000 | 1.846660 | 23.78 | |
| 4 | ∞ | 0.100 | | | |
| 5 | 14.525 | 2.100 | 1.693500 | 53.34 | |
| 6 | −20.733* | 0.900~4.163~8.059 | | | |
| 7 | −34.710 | 0.800 | 1.883000 | 40.79 | Gr2(−) |
| 8 | 7.431 | 1.250 | | | |
| 9 | −11.985 | 0.800 | 1.516800 | 64.20 | |
| 10 | 7.833 | 1.400 | 1.846660 | 23.78 | |
| 11 | 67.126 | 8.381~5.118~1.222 | | | |
| 12 | ∞ | 0.120 | | | ST |
| 13 | 5.734 | 2.100 | 1.622990 | 58.12 | Lp |
| 14 | −49.673 | 0.500 | | | Gr3(+) |
| 15 | 159.819 | 0.700 | 1.584000 | 31.00 | Ln |
| 16 | 9.845* | 6.055~3.112~1.145 | | | |
| 17 | 12.138 | 0.700 | 1.846660 | 23.78 | Gr4(+) |
| 18 | 5.778 | 2.000 | 1.589130 | 61.25 | |
| 19 | −42.491 | 5.543~8.486~10.453 | | | |
| 20 | 10.132 | 1.700 | 1.530480 | 55.72 | Gr5(+) |
| 21 | 15.083* | 3.300 | | | |
| 22 | ∞ | 1.000 | 1.51680 | 64.20 | PT |
| 23 | ∞ | | | | |

| Aspherical Surface Data of Surface i(*) | | | |
|---|---|---|---|
| | Surface 6 | Surface 16 | Surface 21 |
| ϵ | 1.00000 | 1.00000 | 1.00000 |
| A4 | 8.04850E−05 | 1.49990E−03 | 2.15380E−04 |
| A6 | −2.21880E−07 | 4.06360E−05 | 7.67440E−06 |
| A8 | 1.92230E−09 | 2.64610E−06 | |
| A10 | −6.13790E−11 | 2.86120E−08 | |

What is claimed is:

1. A variable magnification optical system for forming an optical image of an object on a light-receiving surface of an image sensor with variable magnification, the variable magnification optical system consisting of: from an object side, a first lens unit having a positive optical power, a second lens unit having a negative optical power, a third lens unit having a positive optical power, a fourth lens unit having a positive optical power, and a fifth lens unit, wherein, in magnification variation from a wide-angle end to a telephoto end, the first lens unit, the third lens unit, and the fifth lens unit are kept in fixed positions whereas the second lens unit and the fourth lens unit move, wherein the third lens unit includes, from the object side, a positive lens element having a biconvex form, and a negative lens element having a form concave to an image side, the negative lens element having an aspherical surface; and wherein conditional formula (1) below is satisfied:

$$1 < f3/fw < 2.6 \quad (1)$$

where f3 represents a focal length of the third lens unit, and fw represents a focal length of an entire system at the wide angle end.

2. The variable magnification optical system according to claim 1, wherein the negative lens element is a meniscus lens element concave to the image side.

3. The variable magnification optical system according to claim 1,
wherein the negative lens element is a plano-concave lens element concave to the image side.

4. The variable magnification optical system according to claim 1,
wherein the third lens unit further includes an aperture stop on a most object side.

5. The variable magnification optical system according to claim 1,
wherein a surface of the negative lens element on the image side is aspherical.

6. The variable magnification optical system according to claim 1,
wherein at least one lens element in the third lens unit is formed of resin.

7. The variable magnification optical system according to claim 1,
wherein focusing is performed by movement of the fourth lens unit.

8. The variable magnification optical system according to claim 1,
wherein the first lens unit has a reflective surface that bends an optical axis at approximately 90 degrees.

9. The variable magnification optical system according to claim 1,
wherein conditional formula (2) below is satisfied:

$$2.5 < ZR < 4 \tag{2}$$

where
ZR represents a magnification variation ratio.

10. An image-taking apparatus comprising: a variable magnification optical system for forming an optical image of an object with variable magnification; and an image sensor for converting the optical image into an electrical signal,
wherein the variable magnification optical system includes: from an object side, a first lens unit having a positive optical power, a second lens unit having a negative optical power, a third lens unit having a positive optical power, a fourth lens unit having a positive optical power, and a fifth lens unit,
wherein, in magnification variation from a wide-angle end to a telephoto end, the first lens unit, the third lens unit, and the fifth lens unit are kept in fixed positions whereas the second lens unit and the fourth lens unit move, and
wherein the third lens unit includes, from the object side, a positive lens element having a biconvex form, and a negative lens element having a form concave to an image side, the negative lens element having an aspherical surface; and
wherein conditional formula (1) below is satisfied:

$$1 < f3/fw < 2.6 \tag{1}$$

where
f3 represents a focal length of the third lens unit, and fw represents a focal length of an entire system at the wide angle end.

11. The image-taking apparatus according to claim 10,
wherein the negative lens element is a meniscus lens element concave to the image side.

12. The image-taking apparatus according to claim 10,
wherein the negative lens element is a plano-concave lens element concave to the image side.

13. The image-taking apparatus according to claim 10,
wherein the third lens unit further includes an aperture stop on a most object side.

14. The image-taking apparatus according to claim 10,
wherein a surface of the negative lens element on the image side is aspherical.

15. The image-taking apparatus according to claim 10,
wherein focusing is performed by movement of the fourth lens unit.

16. The image-taking apparatus according to claim 10,
wherein the first lens unit has a reflective surface that bends an optical axis at approximately 90 degrees.

17. The image-taking apparatus according to claim 10,
wherein conditional formula (2) below is satisfied:

$$2.5 < ZR < 4 \tag{2}$$

where
ZR represents a magnification variation ratio.

* * * * *